United States Patent Office 2,810,125
Patented Oct. 15, 1957

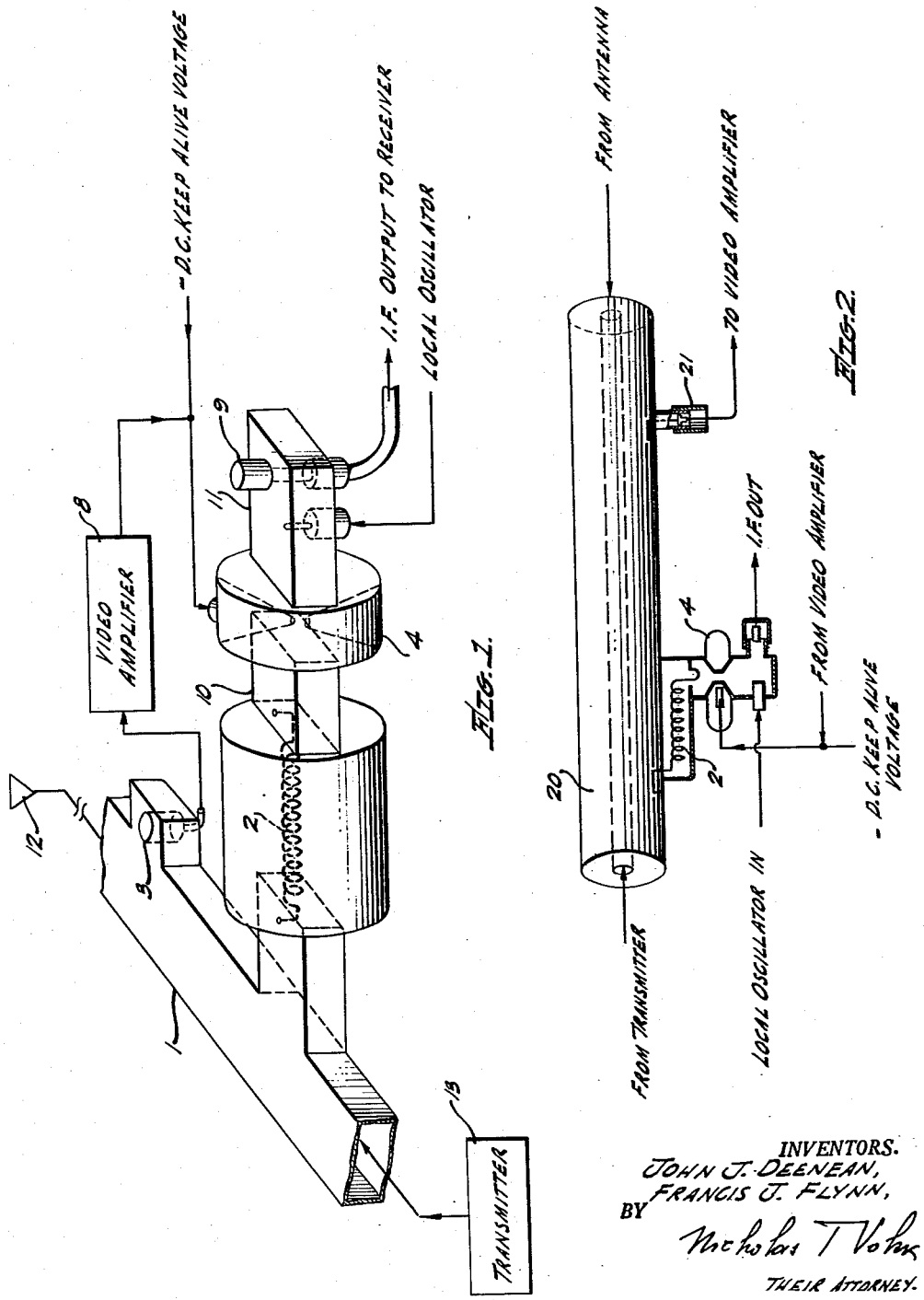

2,810,125

PREPULSE PROTECTION OF RADAR MIXER CRYSTALS

John J. Deenean, Los Angeles, and Francis J. Flynn, Palos Verdes Estates, Calif., assignors to Hughes Aircraft Company, Culver City, Calif., a corporation of Delaware Application February 18, 1954, Serial No. 411,171

7 Claims. (Cl. 343—5)

This invention relates to radar receiver protective systems and more particularly to apparatus for actuating a protective switch prior to the arrival at the switch of a potentially injurious pulse of energy, regardless of the source of energy.

At microwave frequencies the input circuit to a receiver is the mixer, which is easily damaged by large applied signals, and so must be carefully protected. This is especially true of crystal mixers. The protective system disclosed herein is particularly applicable to radar systems where a receiver and transmitter are connected to the same antenna, making it necessary to protect the receiver during the interval of time when the transmitter is in operation. It is also necessary to protect the receiver when it is near some other transmitter, for example another radar, operating at nearly the same frequency, because the adjacent transmitter may impress a signal of an amplitude sufficient to injure the receiver.

Nearly all radar systems today employ a duplexing section containing a T-R switch to permit the use of a single antenna for both transmitting and receiving. The T-R switches generally are gas discharge tubes. If the gas discharge tube is fired by the transmitted pulse a small amount of power may get past the gas discharge tube into the mixer section of the receiver prior to ignition of the tube by the transmitter pulse. To prevent this, prepulsing systems have been employed, as described for example in U. S. Patent No. 2,594,732, entitled "Prefired Transmit-Receive Box Systems," issued to Cork on April 29, 1952.

In general, protection in prepulsing systems is achieved by insertion of means for prefiring the gas discharge tube prior to the arrival of the transmitter pulse across the tube gap. This is effective only to prevent damage by a pulse originating in the particular radar system where the prepulser is located. Damage to the mixer, especially if a crystal, from transmitters operating nearby is prevented, at the present time, by the use of a shutter in the waveguide to block any high level R. F. energy from entering the waveguide. An inherent defect of this method is that it is not effective when the radar system employing the shutter is in operation.

It is therefore an object of this invention to provide an improved duplexer whose switching, and thereby its protective effect, is independent of the energizing source.

It is another object of this invention to provide an improved duplexer whose switching, and thereby its protective effect, is available at all times while the radar system is operating.

It is another object of this invention to provide means for protecting the input circuits of a receiver in a radar system from the damaging effect caused by power getting past the gas discharge T-R switch prior to ignition by the transmitter pulse.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a schematic diagram of a duplexing system embodying the invention;

Fig. 2 shows a modified embodiment of the invention.

Fig. 1 shows a radio frequency energy propagating and confining means, such as a waveguide 1 that connects an antenna 12 to a transmitter 13. One end of a delay means, such as a helical delay line 2, is coupled to the waveguide 1. The other end of the helical delay line is connected by a waveguide 10 to a gas discharge tube 4, the latter having a keep-alive and prefiring electrode. A waveguide 11 couples energy from the gas discharge tube 4 to a crystal mixer 9 employed as the first detector for producing an I. F. frequency composed of the difference between the frequency of the energy getting past the gas discharge tube 4 and the local oscillator frequency. A crystal detector 3, utilized as means for detecting radio frequency energy, couples energy from another point along the waveguide 1 to a video amplifier 8, the latter containing a gain control, such as a potentiometer, for predetermining the amplitude of the output voltage for a given value of energy impinging upon the crystal detector. (See vol. 22, M. I. T. Radiation Laboratories, Series, page 734, Fig. E-6.). The output of the video amplifier is connected to the prefiring electrode of the gas discharge tube 4.

When a pulse of energy enters the waveguide 1 from either the antenna 12 or the transmitter 13, it will be rectified by the crystal detector 3, and applied to the input terminals of the video amplifier 8. The pulse will also appear, at substantially the same time, at the input connection to the delay line 2. When the energy level of the pulse within the waveguide 1 exceeds a predetermined amplitude, the video amplifier will produce a voltage sufficient to fire the gas discharge tube. This voltage is applied to the prefiring electrode causing the gas discharge tube to fire prior to the passage of the pulse through the delay line. The firing of the gas discharge tube creates a short circuit in the waveguide at the place where said gas discharge tube is located, thereby preventing passage of the pulse through the waveguide 11 to the crystal mixer 9. The sensitive crystal mixer 9 is thus protected by the gas discharge tube regardless of the source of a potentially injurious pulse.

The crystal detector 3 and video amplifier 8 are not essential elements of the invention. They are inserted to more accurately predetermine the energy level within the waveguide necessary to prefire the gas discharge tube. They also permit prefiring at energy levels insufficient to fire the gas discharge tube but sufficient to injure the crystal mixer. Though a crystal detector and video amplifier are specified, the type detector and amplifier are, of course, dependent on frequency and other considerations.

A certain amount of power loss will occur in the delay line. This loss is proportional to the duration of the delay. Since returning echoes from pulses originating in the transmitter 13 are already at a low energy level, it is essential that any further loss be prevented. The minimum delay required of the delay line is dependent on the desired prefiring lead time and the inherent delay of the video amplifier. The duration of delay required of the delay line can be decreased, thus reducing losses in the duplexer, by reducing the prefiring lead time and the use of a low delay video amplifier. A helical delay line is specified because of its relatively low loss characteristics. However, any low loss delay line may be used.

The gain of the video amplifier is set at a value whereby a voltage sufficient to fire the gas discharge tube will be produced when the energy level within the waveguide 1 is of a magnitude which would damage the crystal mixer 9, and still permit passage through the gas discharge tube of returning echoes from pulses originating in the transmitter 11.

The duration of the video amplifier output is dependent on the desired prefiring lead time and the duration of the pulse within the waveguide 1. For a description of video amplifiers whose output pulse duration is a function of input pulse duration see vol. 22, M. I. T. Radiation Laboratories Series (1948), page 278, Fig. 7–17, and page 734, Fig. E–6.

Fig. 2 is similar to Fig. 1 except that a co-axial line 20 is used as the transmission means. The delay line 2 is connected at one end to the co-axial line 20 by means of loop coupling. Loop coupling is also utilized to connect the other end of the delay line to the gas discharge switch 4. A cartridge 21 containing the crystal detector is inserted in the co-axial line 20 for rectifying energy within the co-axial line and applying the rectified output to the input of the video amplifier.

The operation of the system shown in Fig. 2 is substantially the same as that of the system shown in Fig. 1.

What is claimed is:

1. A duplexer comprising: means for propagating and confining radio frequency energy along a selected path; a spark gap discharge switch having a prefiring electrode and an input terminal; a delay line, said delay line coupling said energy propagating and confining means to the input terminal of said spark gap discharge switch; means for detecting energy within said propagating and confining means, said detecting means being adapted to develop a control voltage, said detecting means being further coupled to said energy propagating and confining means; an amplifier, said amplifier coupling said detecting means to the prefiring electrode of said spark gap discharge switch, and said switch being adapted to be closed when said control voltage exceeds a predetermined magnitude and thereby made unresponsive to energy from said propagating and confining means which is applied through said delay line to the input terminal of said switch.

2. A duplexer comprising: means for propagating and confining radio frequency energy along a selected path; a spark gap discharge switch having a prefiring electrode and an input terminal; delay means, said delay means coupling said energy propagating and confining means to the input terminal of said spark gap discharge switch; means for detecting radio frequency energy, said detecting means being coupled to said energy propagating and confining means; means coupling said detecting means and said prefiring electrode and being operative to develop a signal which corresponds to the energy in said propagating and confining means, and said prefiring electrode being adapted to be fired at a predetermined level of said signal to close said switch prior to the energy through said delay means being applied to the input terminal of said switch.

3. A duplexer comprising: means for propagating and confining radio frequency energy along a selected path; a spark gap discharge switch having a prefiring electrode and an input terminal; a delay line, said delay line coupling said energy propagating and confining means to the input terminal of said spark gap discharge switch; means for rectifying energy, said rectifying means being coupled to said energy propagating and confining means; means responsive to the rectified energy to develop a voltage representative of the strength of said energy, said voltage developing means being coupled to the prefiring electrode of said spark gap discharge switch, and said switch being adapted to be closed upon the voltage applied to said prefiring electrode reaching a predetermined magnitude to prevent said switch being fired in response to energy from said propagating and confining means which is applied through said delay line to the input terminal of said switch.

4. A duplexer comprising: means for propagating and confining radio frequency energy along a selected path; a spark gap discharge switch having a prefiring electrode and an input terminal; a delay line, said delay line coupling said energy propagating and confining means to the input terminal of said spark gap discharge switch; a detector, said detector being coupled to said energy propagating and confining means and adapted to produce a control voltage in response to radio frequency energy therein; and an amplifier, said amplifier coupling said detector to the prefiring terminal of said spark gap discharge switch to close said switch prior to the passage of radio frequency energy through said delay line to the input terminal of said switch.

5. A duplexer comprising a main waveguide, a branch waveguide, a helical delay line connecting said main waveguide to one end of said branch waveguide, a spark-gap discharge switch connected across said branch waveguide said spark gap switch having a prefiring electrode, a video amplifier having input terminals and output terminals, said output terminals being connected to the prefiring electrode of said spark-gap discharge switch, a crystal detector connected to said main waveguide for producing a unidirectional voltage in response to wave energy in said main waveguide and transferring said unidirectional voltage to said input terminals of the video amplifier to fire said spark-gap discharge switch prior to the passage of wave energy through the delay line and branch waveguide to the switch.

6. A duplexer as set forth in claim 5 wherein said video amplifier is of a type wherein the output pulse duration is a function of the input pulse duration and is provided with a threshold control means for adjusting the input energy level necessary to produce an output pulse of sufficient amplitude to fire said spark-gap discharge switch.

7. In a radar system having a transmitter, a single antenna, a receiver, a main waveguide connecting said transmitter and said antenna, a branch waveguide, a helical delay line connecting the main waveguide to one end of the branch waveguide, a spark-gap discharge switch connected across said branch waveguide and said receiver, said spark-gap switch having a prefiring electrode, a video amplifier having a threshold control for predetermining the input energy level necessary to produce an output pulse of sufficient amplitude to fire said spark-gap discharge switch, means for coupling said output pulse to the prefiring electrode of said spark-gap discharge switch, a crystal detector for rectifying high frequency pulses connected between the main waveguide and the video amplifier to fire said spark-gap discharge switch prior to the passage of energy from the main waveguide through the delay line and branch waveguide into the receiver.

References Cited in the file of this patent

UNITED STATES PATENTS

| | | |
|---|---|---|
| 2,570,893 | Wilkes | Oct. 9, 1951 |
| 2,594,732 | Cork | Apr. 29, 1952 |
| 2,683,251 | Ramo | July 6, 1954 |